July 7, 1959 C. H. O. BERG ET AL 2,893,947
HYDROCARBON CONVERSION PROCESS AND APPARATUS
Filed Oct. 4, 1954
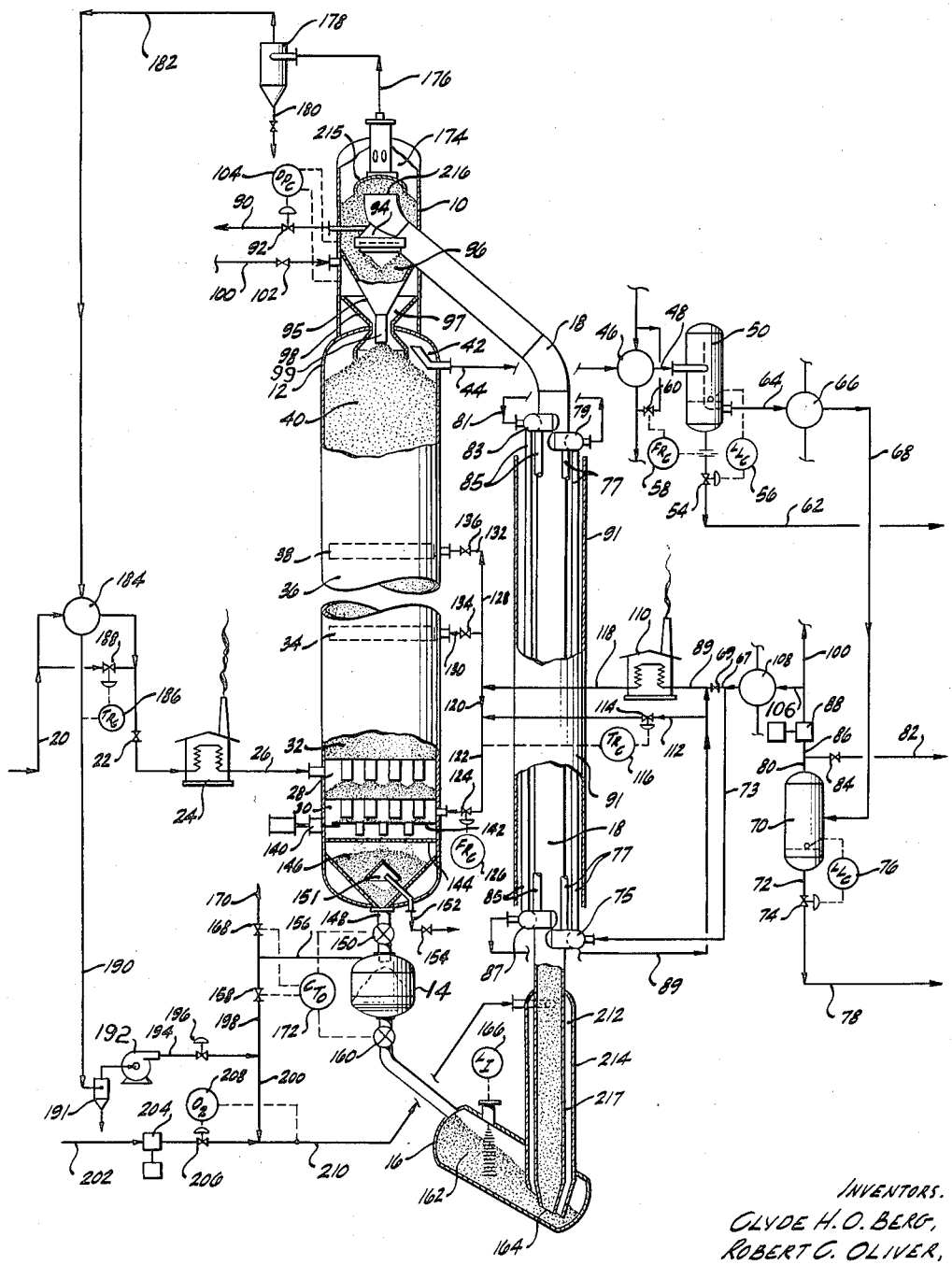
INVENTORS.
CLYDE H. O. BERG,
ROBERT C. OLIVER,

United States Patent Office 2,893,947
Patented July 7, 1959

2,893,947

HYDROCARBON CONVERSION PROCESS AND APPARATUS

Clyde H. O. Berg and Robert C. Oliver, Long Beach, Calif., assignors to Union Oil Company of California, Los Angeles, Calif., a corporation of California Application October 4, 1954, Serial No. 460,140

14 Claims. (Cl. 208—134)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention in the improved method and apparatus for control of the temperature of the reacting fluids passing through the downwardly moving bed of granular solid contact material in the reaction zone, and for the control of the temperature of regeneration of the spent contact material while passing it upwardly as a dense moving bed through a conveyance-regeneration zone concurrently with an oxygen-containing regeneration gas. In this invention, most of the liberated heat of regeneration is removed from the conveyance-regeneration zone directly as sensible heat of the spent conveyance-regeneration fluid. The remaining part of this liberated heat is removed by indirect heat exchange with a cooling medium which cools the conveyance-regeneration zone walls and which is then injected directly into the reaction zone to counteract temperature decreases therein due to endothermic reactions taking place.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions normally boiling between the limits of about 75° F. and about 1000° F. such as the light and heavy naphthas or gasolines and the light and heavy gas-oil fractions are treated at relatively high pressures and temperatures in the presence of solid contact materials to coke, crack, desulfurize, denitrogenate, hydrogenate, dehydrogenate, reform, aromatize, isomerize, or polymerize such hydrocarbon fractions to produce products having desirable properties which particularly well suit them for hydrocarbon cracking feed, gasoline blending stock, solvents, or diesel or jet engine fuels, and the like.

In all of the foregoing processes which utilize a recirculating stream of solid contact material, the usual problems of transporting the solids with minimum energy and without substantial attrition loss in a superatmospheric temperature and pressure system are involved. In some cases separate contacting and regeneration vessels are employed which require separate conveyance steps to transport the solids from the bottom of each vessel to the top of the other. In other cases these processes are effected in a single column so that only a single solids transport step is required, the regenerator and reactor being located one above the other in the column. The disadvantage of the former modification is the necessity for two columns and the requirement for two separate solids handling steps. The principal disadvantage of the second modification is primarily structural in that with super-imposed reaction and regeneration zones an excessively high mechanical structure is required, sometimes exceeding 200 feet in elevation. A further disadvantage of the single column operation lies in the fact that the total conveyance distance is not materially different from the total conveyance distance in the two-column modification.

Conveniently, the granular solids have been conveyed for recirculation by mechanical elevators, by suspension in a conveyance fluid in the well-known gas lift or pneumatic conveyance systems, and the like. Although the mechanical elevators operate with quite low energy requirements, they are practically impossible to maintain at operating temperatures of around 1000° F. and at superatmospheric pressure conditions. Although the so-called gas-lift type of conveyor readily operates at superatmospheric pressures, tremendous quantities of lift gas are required in contacting systems recirculating contact material at high solids to fluid ratios. In addition, the fact that the solid particles move at relatively high velocities of the order of 50-100 feet per second and are free to impact the inner conveyor walls and each other is the cause of an excessively high solids or catalyst attrition rate.

In many contacting processes, a substantial change in temperature of the fluid occurs during passage through the contacting zone due to endothermic or exothermic reactions. For example, in the straight desulfurization of hydrocarbons such as gas-oil or naphtha in the presence of hydrogen and a catalyst such as cobalt molybdate substantial temperature increases as high as 200° F. are experienced. In gasoline reforming in the presence of hydrogen and a catalyst such as cobalt molybdate and under different temperature and pressure conditions, temperature decreases as high as 100° F. occur in the conversion zone due to the endothermic nature of hydrocarbon aromatization reactions. The conventional equipment and process steps for compensating for such temperature changes are so complex that few if any commercial solids-fluid contacting processes have been designed, built, and operated to control them.

The present invention is therefore directed to an integrated solids-fluid contacting process in which the conveyance and regeneration and temperature control problems indicated above are simultaneously eliminated by employing several novel and simple process steps and apparatus.

It is a primary object of this invention to provide an improved process for fluid-solids contacting operations in which granular solids are recirculated and simultaneously treated to effect a substantially complete reheating or regeneration during a single conveyance step, and in which the conveyance distance is approximately one-half that usually required.

It is also an object of this invention to provide an improved solids-fluid contacting process in which effective control of fluid temperature throughout the contacting zone is effected by the injection of additional fluid thereinto.

A more specific object of this invention is to control the catalyst temperature in the conveyance-regeneration zone as well as the temperature of the walls thereof and to control the temperature existing in the contacting or reaction zone by the step of recirculating a conveyance-regeneration fluid directly through the solid contact material in the conveyance-regeneration zone and through a heat interchange zone, and by the step of passing a reactant fluid first in indirect heat exchange relation with said solid contact material and then into direct contact with the solid material in the reaction zone.

It is an additional object of this invention to provide an improved apparatus for accomplishing the foregoing objects.

Other objects and advantages of the present invention will become apparent to those skilled in the art as the description thereof proceeds.

Briefly, the present invention comprises an improved process and apparatus for the continuous contacting of reactive fluids with granular solid contact material in a reaction or conversion zone. The granular material, which may have catalytic properties, is recirculated from the bottom of a reaction zone upwardly as a substantially compact or dense-packed moving bed of granular solids through a conveyance-regeneration zone and is discharged therefrom in fully regenerated form into the top of the reaction zone for reuse.

It is immediately apparent that the double conveyance required in the conventional contacting processes employing separate regeneration and reaction vessels has been avoided and substituted with a single conveyance of less than half the distance heretofore required because the usually required sealing legs of great length used in gas-lift suspension conveyances are eliminated. It is also apparent that the distance for conveyance in this invention is reduced by more than one-half from the distance required in the conventional processes using superimposed reaction and regeneration zones and that accordingly the physical structure of the apparatus of this invention has been substantially reduced with attendant economic savings.

Spent granular solids removed from the bottom of the reaction zone are conveyed upwardly as a dense moving bed through the conveyance-regeneration zone or conduit by employing a series of novel and critical steps. The spent granular solids are introduced into the conveyance-regeneration zone in such a manner that its inlet opening is submerged and surrounded by a dense bed of solids to be conveyed. This is conveniently done by providing an induction zone or chamber into which the solids may be introduced at its upper end and surrounding the inlet opening of the conveyance-regeneration zone at a low point therein so that solids upon introduction cover and submerge the inlet opening. Immediately adjacent the outlet opening of the conveyance-regeneration zone, a means is provided for applying a thrust or compacting force against the moving bed of regenerated and conveyed granular material discharging therefrom. This may be done in several ways including the disposition of a mesh or plate or cap immediately adjacent the outlet opening against which the moving bed of solids flows and then reverses its direction. The same result may be obtained by discharging the solids in any direction directly into a chamber against a wall of the chamber or against a bed of previously discharged solids so that the outlet opening is submerged by a bed of such solids. The solids may thus be discharged upwardly or horizontally, or downwardly into such a chamber to form a conical pile of discharged solids whose apex intersects the outlet opening. The object of this step is to in some way restrict the discharge of solids at the outlet opening without effecting any substantial restriction on the discharge of conveyance-regeneration fluid at the same point. The granular material in the conveyance-regeneration line is thus prevented from becoming fluidized or suspended in the conveyance fluid while it is moved. In this way the moving solids are maintained substantially at their static bulk density, that is, at the same bulk density as that of a downwardly moving gravity-packed bed, which in turn is substantially the same as the bulk density of the solids when at rest.

The granular solids in this dense-packed form are caused to move by passing a concurrent flow of conveyance-regeneration fluid upwardly through the conveyance-regeneration zone at a rate sufficient to overcome the opposing forces of gravity acting on the solids and also to overcome opposing forces of friction of conveyance zone walls and the like which act against the solids when they are conveyed. This fluid flows through the serially connected interstices of the dense-packed mass of granular solids which presents a high resistance elongated path for the fluid flow. By maintaining a substantial pressure differential between the inlet and the outlet of the conveyance-regeneration zone, a sufficient quantity of fluid is forced to flow therethrough generating a more or less constant pressure gradient at all points along the length of the conveyance-regeneration zone so as to apply a conveyance force to the solids mass uniformly throughout the zone. The ratio of the resulting conveyance force tending to move the solids to the forces of gravity acting in the opposite direction has been termed the conveyance force ratio and is given by:

$$\frac{\frac{dp}{dl}}{\rho_s \cos \theta} \quad (1)$$

wherein $$\frac{dp}{dl}$$

is the pressure gradient in pounds per square foot per foot of conveyance regeneration zone length, $\rho_s$ is the static bulk density of the granular solids being conveyed in pounds per cubic foot, and $\theta$ is the angular deviation of the direction of conveyance from an upward vertical reference axis. When the conveyance fluid flows at a rate sufficient to generate a pressure gradient which exceeds the forces of gravity expressed by the term ($\rho_s \cos \theta$) in Equation 1, a slight additional flow of fluid is sufficient to exceed opposing forces of friction and permit the solids to move continuously in dense or compact form as an upwardly moving bed when a bed of solids is continuously supplied at the inlet and dense granular solids are continuously withdrawn at a controlled rate from the discharged mass of solids at the outlet of the conveyance-regeneration zone.

Because of the substantial pressure gradient characteristic of this form of conveyance and because of the fact that there is only a relatively minor pressure differential existing between the inlet and outlet of a solids-fluid contacting vessel, it is apparent that the present conveyance-regeneration system cannot be directly connected at both its outlet and inlet respectively to the solids inlet and outlet of the contacting zone. In the present invention only one of the aforementioned connections is made and the other connection is made indirectly through a granular solids pressuring vessel into which granular solids are charged at a relatively low pressure, the vessel is sealed, high pressure fluid is injected to increase the pressure by an amount approximating the characteristic pressure differential of the conveyance-regeneration zone, and then the solids are discharged at the higher pressure. If the inlet to the conveyance-regeneration zone communicates directly with the outlet of the reaction zone, this pressuring step is employed to receive solids from the outlet of the conveyance-regeneration zone and to pressure them into the top of the reaction zone. When the outlet of the conveyance zone communicates directly with and at substantially the same pressure as the reaction zone, the pressuring zone receives solids at that pressure from the bottom of the reaction zone and pressures them into the inlet of the conveyance-regeneration zone as is illustrated in the accompanying drawing. So far as the present invention is concerned, the pressuring step can be in any part of the cycle, that is, either before or after conveyance-regeneration.

The present invention is particularly well adapted to the handling of granular solid materials in the well-known hydrocarbon conversion processes mentioned above and in which a liquid or vaporized hydrocarbon is contacted directly with a moving mass of contact material, usually having catalytic activity. During such process, the catalyst ordinarily becomes deactivated after a variable period of contact and is contaminated by a hydrocarbonaceous deposit generally referred to as "coke." During the regeneration, the coked catalyst is treated with an oxygen-containing regeneration gas whereby the hydrocarbonaceous material is burned from the catalyst and the activity is restored. With most spent hydrocarbon conversion catalysts, the oxygen-containing regeneration gas will not initiate and sustain combustion nutil the spent catalyst is raised in temperature to about 700° F. Most hydrocarbon conversion catalysts also cannot be heated during regeneration to temperatures much above about 1100° F. and the spent conveyance-regeneration gas is disengaged from the regenerated catalyst at temperatures below this value. These then are the temperature limits within which the coveyance-regeneration zone must operate when handling spent hydrocarbon conversion catalysts.

In the process of this invention, the removal of heat from the conveyance-regeneration zone is by direct heat exchange and is effected by maintaining a recycle of conveyance-regeneation gas upwardly through the conveyance-regeneration zone and then through external heat interchange means and back into the inlet of the zone. The conveyance-regeneration gas is disengaged from the regenerated solids and discharged at the top of the unit at temperatures of the order of 1000° F. Ordinarily these gases can only be cooled to a temperature which will initiate combustion of the hydrocarbonaceous spent solids, that is, about 700° F. However, in the present invention a special or primary heat interchange step is effected along at least the first part of the length of the conveyance-regeneration zone itself thereby maintaining low wall temperatures and permitting the regeneration gases to be cooled externally to temperatures considerably below this usual minimum temperature and then reheated at least to the minimum 700° F. value in the primary heat exchange zone before the gases are introduced into the regeneration zone inlet. This permits a substantial decrease in the required diameter of the conveyance-regenerator conduit which improves the heat transfer and also decreases the quantity of conveyance-regeneration gas recycle needed to remove the heat generated in the regeneration system. This is due to the fact that in this specific type of upflow conveyance-regeneration the major portion of the coke burn-off occurs in the lower or first portion of the conveyance-regeneration zone and the minor portion of regeneration occurs in the upper regions of the zone. Accordingly the externally cooled regeneration gas is preheated from well below the spent catalyst ignition temperature by passing it around the lower part of the conveyance-regeneration zone whereby it cools the zone walls and is heated to the temperature necessary to initiate combustion. It is then introduced with the abosrbed sensible heat directly into the conveyance-regeneration zone for upward passage therethrough. Employing this technique has permitted reductions in conveyance-regeneration fluid recycle of up to 75% because the recycle gas can herein readily be cooled from 950° F. or higher to as low as 150° F. or lower (with condensate removal provision) instead of only to the 700° F. figure mentioned above.

The walls of the upper part of the conveyance-regeneration zone are kept cool by passing a reactant fluid through an indirect or secondary heat exchange zone which extends along at least a substantial portion of the conveyance-regeneration zone above the primary heat exchange zone. This reactant fluid is thereby preheated by absorption of heat of regeneration liberated in the upper reaches of the regenerator and this heated reactant is introduced directly into the reaction zone as described below.

These two heat exchange steps, effected in the primary and secondary heat exchange zones described, permit the operation of the conveyance-regeneration zone at temperatures well below the 975° F. maximum for inexpensive low alloy steel and considerably below the 1000° F.–1100° F. catalyst temperature during regeneration. The regenerator wall thickness required is considerably less than that required in conventional systems, or in a given installation using high alloy steel, higher regeneration temperatures and coke burn-off rates can be used. Furthermore, the pressure drop is reduced for a given gas rate through the regenerator, or in a given installation operating at a fixed pressure drop, higher regeneration gas rates are permitted. Of great added advantage in this conveyance-regeneration zone with primary and secondary heat exchange is the fact that the "coke" burning capacity of the system, which is limited by the peak temperature, is considerably increased because the increased allowable regeneration gas flow carries out greater amounts of sensible heat from the regeneration and also substantially increases the radial thermal conductivity of the upwardly moving solids bed. The latter effect permits more heat to be removed indirectly in the secondary heat exchange zone, further lowering the regeneration temperature and allowing still greater regeneration gas flow at the same pressure differential. Thus these effects have been found to be strongly interrelated and result in an exceedingly efficient heat control during the upflow regeneration.

The control of temperature within the contacting or reaction zone is accomplished by the injection of at least one reactant fluid stream at an intermediate point along the length of the zone. The temperature of the injected stream is higher than the desired reaction temperature for endothermic reactions and lower for exothermic reactions. The flow rate of the injected fluid is correlated with the reactant fluid flow rate and the degree to which the reactions are exothermic or endothermic so as to maintain the desired average temperature in the reaction or contacting zone. The number of injection points used is determined by the degree of uniformity of temperature required in the reaction zone.

The injected fluid in this invention may be directly injected at one or more points into the moving solids bed in the reaction zone, or it may be injected into one or a plurality of jet pumps maintained within the reaction zone. When the latter procedure is used, at least a part of the reacting fluids is disengaged from the bed of solid contact material, these fluids are then mixed with the injected fluids out of contact with solid material to avoid overheating or overcooling the solids, and the mixture then flows into contact with further solid material at the desired temperature. These disengaging, mixing, and re-engaging steps may be repeated one or more times along the length of the reaction or contacting column to maintain the desired temperature profile therein.

In hydrocarbon conversion reactions, such as catalytic desulfurization, denitrogenation, reforming, and the like which are effected in the presence of a recycled stream containing hydrogen, at least a portion of this recycle stream may be heated or cooled to temperatures above or below the desired reaction temperature respectively and injected as one or more separate streams into the reaction zone to effect temperature control as hereinafter more fully described. Thus heat recovered in controlling the catalyst regeneration is utilized in the contacting or conversion zone without the use of extraneous heat exchange media.

The present invention will be more readily understood by reference to the following description of the attached drawing in which is shown a schematic flow diagram of the process of this invention and a detailed elevation view in partial cross section of the reaction and regeneration apparatus. The description is conducted in the form of a specific example of the invention as applied to the continuous catalytic reforming and desulfurization of a petroleum naphtha in the presence of hydrogen and a cobalt molybdate catalyst.

The permissible operating conditions for naphtha reforming and desulfurization are from 700 to 1100° F., from 50 to 2000 p.s.i.g., and from 500 to 10,000 s.c.f. of hydrogen per barrel of naphtha feed. The following example gives the specific operating conditions of one installation.

Referring now more particularly to the drawing, the apparatus consists essentially of catalyst separator and pretreating chamber 10 into which the regenerated catalyst is discharged, naphtha reforming and desulfurization column 12 through which the catalyst passes downwardly as a moving bed by gravity, catalyst pressuring chamber 14 receiving spent catalyst from column 12, induction chamber 16 into which the spent pressured catalyst is discharged, and conveyance-regeneration chamber 18 through which the spent catalyst is conveyed and regenerated and discharged for recirculation into separator chamber 10.

The apparatus of this invention as shown in the drawing is for the catalytic reforming and desulfurization of 1100 barrels per stream day of a petroleum naphtha having the following properties:

TABLE I

*Naphtha feed*

| | |
|---|---|
| Boiling range, ° F. | 240–420 |
| API gravity | 46.3 |
| Sulfur, weight percent | 0.578 |
| Nitrogen, weight percent | 0.020 |
| Knock rating (F–1 clear) | 61.8 |
| Naphthalenes, volume percent | 42 |
| Aromatics, volume percent | 15 |

This naphtha feed is introduced through line 20 at a rate of 1100 barrels per day controlled by valve 22 and is preheated by exchange with hot regeneration gas recycle in interchanger 184 described subsequently, and then is further heated and vaporized in fired heater 24. The naphtha vapor is introduced through transfer line 26 at a temperature of 900° F. and a pressure of 405 p.s.i.g. into naphtha engaging zone 28 in column 12. A primary stream of recycle gas containing hydrogen is introduced through primary recycle gas engaging zone 30 at a rate of 1700 M s.c.f. per day and at a temperature of 900° F. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes, hydrocarbon derivatives of sulfur are decomposed and hydrogenated in an exothermic reaction, and the endothermic aromatization of the naphthene hydrocarbons taking place predominates and results in a net temperature decrease. To maintain an approximately constant temperature profile throughout reaction column 12, a secondary hydrogen recycle stream is introduced into secondary recycle gas engaging and injection zone 34 at a temperature of 1150° F. and at a rate of 1130 M s.c.f. per day to increase the temperature of the reacting mixture to 910° F. The thus reheated mixture passes countercurrent to the catalyst through secondary reforming zone 36 wherein a further temperature decrease takes place due to the continuing endothermic aromatization reactions. A tertiary stream of recycle gas at 1150° F. is introduced into tertiary recycle gas engaging and injection zone 38 at a rate of 1290 M s.c.f. per day to raise the reactant mixture temperature again to about 910° F. The mixture then continues upwardly through tertiary reforming zone 40 from which the effluent is removed from disengaging zone 42 at a temperature of about 880° F. and at 400 p.s.i.g. through line 44. The total hydrogen introduced amounts to about 3750 s.c.f. per barrel of naphtha feed.

The effluent vapor is passed through interchanger 46 wherein heat is recovered in depropanizing the product and for preheating the naphtha feed and is thereby cooled to a temperature of 450° F. which is just sufficiently below the dew point of the effluent to effect a partial condensation of polymeric high boiling hydrocarbon materials having substantial gum forming tendencies when employed as internal combustion engine fuels. The cooled and partially condensed effluent then passes through line 48 and is introduced into centrifugal separator 50 which is preferably a cyclone known as the Webre cyclone. Herein the partial condensate, amounting to not more than a few percent of the total effluent, is separated from the vapor and is removed through line 62 at a rate controlled by valve 54 in accordance with liquid level controller 56. Flow recorder controller 58, which is adjusted to maintain a predetermined rate of flow of condensate through line 52, operates coolant by-pass valve 60 so that the hot effluent flowing through line 44 is cooled sufficiently to partially condense that desired proportion of the reactor effluent.

The preferred proportion so condensed is a very minor amount ranging from 0.01% up to about 10% by volume. Preferably this proportion is between about 0.1% and about 5%, and in the experimental verification of the present invention it has been found that partial condensation of about 2.0% by volume was sufficient to substantially eliminate the so-called heavy ends or polymer from the effluent so as to avoid the usual necessity for rerunning the depropanized liquid product, which invariably results in some thermal degradation forming additional high boiling polymeric materials.

In the present operation, about 2% by volume of the effluent is condensed and is removed at a rate of 22 barrels per day by means of line 62. This material contains some reformed gasoline boiling below about 420° F. and accordingly is returned for recovery by redistillation with the material from which the naphtha feed to the process of this invention is prepared. This step, not shown for sake of simplicity in the drawing, is entirely conventional and effects a recovery of approximately 14.5 barrels of reformed gasoline boiling range product boiling below about 420° F. leaving the highly aromatic polymer boiling above 420° F. This polymer is useful as a weed killer or reclaimed rubber modifier.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the condensate. The reformed naphtha product is removed through line 72 at a rate of 1118 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naptha product*

| | |
|---|---|
| Boiling range, degree F. | 94–435 |
| API gravity | 51.7 |
| Sulfur, weight percent | 0.004 |
| Nitrogen, weight percent | 0.001 |
| Knock rating (F–1+3 cc. TEL) | 95 |
| Naphthenes, volume percent | 14 |
| Aromatics, volume percent | 40 |

The uncondensed portion of the effluent consists essentially of the hydrogen-containing recycle gas which is removed from separator 70 by means of line 80 and because of the net production of hydrogen in the process, the excess is bled from the system through line 82 at a rate of 140 M s.c.f. per day controlled by valve 84. Part or all of this gas may be employed as fuel in the fired heaters in the process if desired.

The remaining recycle gas is passed through line 86 and is compressed from 375 p.s.i.g. to 425 p.s.i.g. in recycle gas compressor 88. Part of this compressed recycle gas is passed as a regenerated catalyst pretreating gas through line 100 at a rate of 165 M s.c.f. per day controlled by valve 102 into separator and catalyst pretreating chamber 10. This pretreating gas is introduced below and around cone-shaped baffle 95 and passes therefrom downwardly through the annular space 97 constituting a pretreating gas engaging zone within the lower periphery of baffle 98 and then directly into the bed of regenerated catalyst within baffle 98 at the top of chamber 12. A secondary portion of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxides. The pretreating gas, along with the secondary portion of regeneration gas subsequently described coming down from the top of the lift line with the regenerated catalyst, is removed from beneath baffle or pretreating and sealing gas disengaging zone 94 through line 90 controlled by valve 92. The primary portion of the pretreating gas introduced through line 100 and passed downwardly through pretreating gas engaging zone 97 passes through the solids within baffle 98 and radially outwardly below the lower periphery of baffle 98 and is disengaged from the catalyst bed with the total reactor effluent in disengaging zone 42 at points around the lower periphery of baffle 98 and through line 44. It acts as a seal gas preventing the upflow of reactor effluent into the pretreating chamber 10. The secondary streams of pretreating gas and regeneration gas are removed from separator chamber 10 at disengaging zone 94 through line 90 at a rate of 205 M s.c.f. per day controlled by valve 92 which in turn is actuated by differential pressure controller 104. This maintains a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M s.c.f. per day through line 106 and is partially preheated in interchanger 108 to 350° F. in exchange with the reactor effluent after polymer removal (interchanger 66).

This partially preheated recycle gas stream is then passed at least in part through line 73 into half ring or hemitoroidal inlet manifold 75 of the secondary heat exchange zone associated with the upper part of the conveyance-regenerator as described above. Any remaining part may be by-passed around the secondary heat exchange zone through line 67 controlled by valve 69. This heat exchange zone partially surrounds a substantial length of the lift line regenerator 18 above the flue gas preheating zone 212 (the primary heat exchange zone) described below. The gas passes upwardly through a plurality of tubes 77 disposed adjacent the outer wall of regenerator 18 to first intermediate manifold 79, through transfer line 81 into second intermediate manifold 83, and then through another plurality of tubes 85 adjacent the other side of the regenerator wall into semicircular outlet manifold 87. The intermediate manifolds are also hemitoroidal forming with the tubes 77 and 85 and the semicircular inlet and outlet manifolds a tube cage surrounding a substantial portion of the regenerator. The tubes may be placed in direct physical contact with the regenerator wall, or may be spaced slightly apart therefrom. This tube cage is surrounded by a sheet metal jacket 91 which acts as a heat reflector and supports a layer of insulation around the cage. It has been found that the heat transfer is primarily by radiation and that the heat is readily transferred in spite of moderately small air gaps between the tube cage and the regenerator walls. Under operating conditions, the catalyst temperature in the center of that part of the regenerator within the tube cage ranges between about 1030° F. and about 1090° F. which is sufficiently below the maximum of about 1200° F. which the catalyst can stand without thermal damage. The wall temperature of the regenerator conduit structure over the same interval ranges between about 800° F. and about 925° F., which which is well below the 975° F. maximum required to avoid the use of expensive high alloy steels. The regenerator wall temperature above the tube cage is also well below the 975° F. figure. This permits the upwardly moving catalyst to be regenerated at maximum rates of coke burnoff, permits the use of low alloy steel, and at the same time recovers a substantial amount of the heat of regeneration for use in the reaction zone. The inlet and outlet manifolds may be located at the top of the tube cage if desired.

The recycle hydrogen at a temperature of about 400° F. passes from outlet manifold 87 through line 89 for further preheating. The major portion is passed through fired preheater 110 and heated therein to a temperature of 1150° F., and the remainder, 630 M s.c.f. per day, passes through by-pass line 112 at a rate controlled by valve 114 in response to temperature recorder controller 116. The primary hydrogen recycle gas stream, introduced into engaging zone 30 at a rate of 1700 M s.c.f. per day and at 900° F., is produced by mixing 1070 M s.c.f. per day of 1150° F. hydrogen flowing through lines 118 and 120 with the 630 M s.c.f. per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s.c.f. per day and 1290 M s.c.f. per day controlled by valves 134 and 136 respectively.

The spent hydrocarbonaceous catalyst passes downwardly through the column 12 at a rate of about 860 pounds per hour controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by valve 150.

The spent solids are thus discharged into pressuring chamber 14 when it is depressured to about 400 p.s.i.g. causing a displacement gas to flow upwardly through outlet 148 into the bottom of reactor 12. A second seal gas comprising a mixture of this last-named gas and a small portion of the primary recycle gas stream, which passes downwardly through solids feeder 140, is removed from disengaging zone 151 through line 152 at a rate of 140 M s.c.f. per day controlled by valve 154. This gas is mixed with the spent catalyst pretreating gas removed from the upper part of the column through line 90 and is employed as fuel.

The spent granular solids in pressuring chamber 14 are raised in pressure to 430 p.s.i.g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, valve 168 is opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140, that is, 860 pounds per hour.

Referring now to solids pretreater and separator 10, spent conveyance-regeneration gases are disengaged from the conveyed solids and a primary or major portion collecting in space 174 is removed therefrom through line 176 at a rate of 1596 M s.c.f. per day and a temperature of 866° F. A secondary or minor stream passes downwardly with the solids and enters pretreating and seal gas disengaging zone 94 as described. The primary or major gas portion is passed into solids separator 178 wherein any catalyst fines elutriated from the catalyst stream in separator 10 are removed from the regeneration gas recycle. These solids are removed from separator 178 by means of line 180. The solids-free recycle gas then flows through line 182 through heat exchanger 184 in exchange with raw naphtha feed referred to above and is therein cooled to a temperature of about 700° F. This temperature is controlled by temperature recorder controller 186 which operates by-pass valve 188 so as to control the naphtha coolant passing through interchanger 184. The cooled recycle gas passes through line 190 and is compressed to 430 p.s.i.g. in compressor 192. This recycle gas then flows through line 194 at a rate controlled by valve 196 and is divided into a solids pressuring stream bowing through line 198 to pressure solids in chamber 14, and a conveyance-regeneration stream flowing from line 200.

An oxygen-containing gas, such as air, is introduced via line 202. It is compressed to 433 p.s.i.g. in compressor 204 and is introduced at a rate of 139 M s.c.f. per day controlled by valve 206 in response to oxygen recorder controller 208 for combination with the compressed conveyance-regeneration recycle gas flowing through line 200. The combined oxygen-containing conveyance-regeneration gas, which may contain from about 0.1 to about 10% oxygen and preferably from 0.5 to 5.0% oxygen, then passes at a temperature of about 696° F. and at a rate of 1735 M s.c.f. per day through line 210 tangentially into the upper portion of regenerator or primary heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 cooling the wall of the conveyance-regeneration conduit and is preheated to about 711° F. therein by means of the exothermic heat of regeneration liberated within the lower part of conveyance-regeneration zone 18. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof. As stated above, the major part of the coke burnoff from the catalyst occurs in the lower or first part of the conveyance-regeneration zone and a part of this exothermic heat is transferred through the conveyance conduit wall to preheat the conveyance-regeneration gas recycle and to keep the inner conveyance-regeneration conduit wall 217 cool.

The spent granular catalyst is substantially completely regenerated and freed of the hydrocarbonaceous residue while passing upwardly through the conveyance-regeneration conduit. This catalyst is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited in any way by the height of the conveyer-regenerator or by the velocity of the conveyance-regeneration fluid circulated therethrough, as is the case in the conventional gas-lift or suspended solids systems. Once the conveyance fluid rate is sufficient to generate a pressure gradient which exceeds the forces of gravity and friction on the moving bed, the catalyst will move as long as solids are continuously fed at the inlet and removed from the outlet. Any necessary increases in conveyance-regeneration fluid rate necessary to remove heat from the system have absolutely no effect whatsoever upon the residence time of the catalyst in the system or the degree to which it is regenerated and the only external effect is one of somewhat increased pressure differential.

Accordingly, in the present process the spent catalyst may be completely regenerated by the removal of the entire quantity of hydrocarbonaceous deactivating materials during conveyance. In the present example, this is accomplished by utilizing an oxygen concentration of about 1.7% by volume at the inlet of the conveyance-regeneration zone and usually less than 0.5% by volume at the outlet. The spent catalyst contains about 2.2% by weight of "coke" and is discharged into separator 10 after regeneration containing less than about 0.1% carbon and the restoration of activity is essentially 100%. The catalyst residence time in the regenerator is 18 hours in this case.

Because of the novel heat transfer system maintained at the base of the conveyance-regeneration system, very substantial reductions of as much as 75% in the conveyance fluid recycle rate is attained relative to that resulting if the cooling of the gas were limited to a minimum temperature of 750° F., the regenerator inlet temperature needed to maintain spent catalyst combustion because the conveyance fluid recycle stream may be cooled in exchanger 184 to temperatures as low as 150° F. or lower (with provision for condensate removal in separator 191 if necessary) with this particular regenerator. An additional reduction in conveyance-regeneration fluid recycle is obtained due to the secondary or tube cage heat exchange zone along the upper part of the regenerator.

In the apparatus of this invention, the entire structure above grade level is about 55 feet in height, the reactor column diameter is 4 feet 6 inches, and the conveyance-regeneration conduit is 14-inch O.D. The catalyst is circulated at a rate of 10.3 tons per day or 860 pounds per hour, and moves at an upward velocity of 15.5 feet per hour through the conveyance-regeneration conduit. This low velocity is totally impossible to maintain in a gas-lift or pneumatic conveyer in which the solids are suspended, and herein it permits the complete regeneration of the catalyst during the lifting step which is likewise not possible in the gas lift conveyance.

Although the present invention has been described in considerable detail above with respect to gasoline or naphtha reforming and desulfurization, it should be understood that the principles of this invention and the advantages accruing therefrom are equally obtainable in any other hydrocarbon conversion process in which a recirculating granular contact material which requires regeneration is employed. It is therefore not intended to limit this invention to gasoline reforming specifically but on the contrary the invention relates to fluid-solids contact processes in general in which an exothermic regeneration of the recirculating contact material occurs. This is true in most, if not all, of the hydrocarbon conversion processes employing contact solids including solid catalysts.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a solids-fluid contacting process wherein a granular solid contact material is recirculated through a fluid contacting zone and then upwardly as a dense bed through a solids regeneration zone, a fluid to be contacted is passed through said contacting zone in direct contact with said solid contact material therein and undergoes reactions whose heat effects normally cause the fluid temperature to change during the contact, a conveyance-regeneration fluid is passed upwardly through said conveyance-regeneration zone at a rate controlled to maintain a substantial pressure gradient therein sufficient to convey said material therethrough and to regenerate it substantially completely without further treatment, and a restriction is applied against the mass of regenerated material discharging at the outlet of said conveyance-regeneration zone to maintain said material therein as a dense mass having substantially the static bulk density of said solid material when at rest, the improvement in combination therewith which comprises the steps of recirculating said conveyance-regeneration fluid from the outlet of said conveyance-regeneration zone through a cooling zone, cooling said fluid therein to dissipate part of the heat of regeneration contained as sensible heat of said fluid, admixing fresh regeneration fluid with the cooled fluid, passing the mixed fluid through an indirect heat exchange zone disposed around the lower walls of said conveyance-regeneration zone, wherein said mixed fluid is allowed to contact the walls of said conveyance-regeneration zone to cool the same and to heat said mixed fluid, injecting the heated fluid therefrom directly into the inlet of said conveyance-regeneration zone, passing at least part of said fluid to be contacted through a radiant heat exchange zone spaced outwardly from and around a substantial portion of the upper walls of said conveyance-regeneration zone, whereby the fluid in said radiant heat exchange zone does not contact the walls of said conveyance-regeneration zone but is heated by radiation thereby cooling the walls of said conveyance-regeneration zone and heating said fluid by radiation, and injecting the thus heated fluid into said contacting zone to contact said solid contact material therein.

2. A process according to claim 1 in combination with the steps of controlling the rate of flow of said fluid to be contacted through said radiant heat exchange zone to maintain the walls of said conveyance-regeneration zone below about 975° F.

3. A process according to claim 1 wherein said fluid to be contacted comprises a hydrocarbon, said spent solids contain a hydrocarbonaceous deposit, and said conveyance-regeneration fluid introduced into said conveyance-regeneration zone comprises flue gas containing between about 0.1% and about 10.0% of oxygen.

4. In a hydrocarbon conversion process wherein a granular solid hydrocarbon conversion catalyst is recirculated through a hydrocarbon conversion zone and then upwardly as a dense mass through a catalyst regeneration zone, said hydrocarbon is passed under conversion conditions of temperature, pressure, and composition through said conversion zone in direct contact with said catalyst forming a spent hydrocarbonaceous catalyst and a converted hydrocarbon and wherein the conversion reactions occurring normally cause changes in the conversion zone temperature, an oxygen-containing conveyance-regeneration gas is passed upwardly through said conveyance-regeneration zone at a rate controlled to maintain therein a substantial pressure gradient sufficient to convey said spent catalyst therethrough and substantially completely burn the hydrocarbonaceous deposit therefrom without further treatment and a restriction is applied against the mass of regenerated catalyst solids discharging at the outlet of said conveyance-regeneration zone to maintain said catalyst therein as a dense mass having substantially the static bulk density of said catalyst solid when at rest, the improvement in combination therewith which comprises the steps of recirculating said conveyance-regeneration gas from the outlet of said conveyance-regeneration zone through a cooling zone, cooling said gas therein to dissipate part of the heat of regeneration contained as sensible heat of said gas, adding a controlled amount of oxygen to the cooled gas, passing this fresh conveyance-regeneration gas mixture through an indirect heat exchange zone surrounding the lower walls of said conveyance-regeneration zone, wherein said gas mixture is allowed to contact the walls of said conveyance-regeneration zone, the flow rate of said gas mixture through said indirect heat exchange zone being sufficient to cool said walls to below about 975° F. and preheat said gas mixture, injecting the thus heated gas mixture directly into the inlet of said conveyance-regeneration zone for passage upwardly therethrough, passing at least part of a fluid to be contacted with said catalyst in said conversion zone through a radiant heat exchange zone spaced outwardly from and surrounding a substantial portion of said conveyance-regeneration zone above said indirect heat exchange zone, whereby the fluid in said radiant heat exchange zone does not contact the walls of said conveyance-regeneration zone but is heated by radiation thereby cooling the walls of said conveyance-regeneration zone and heating said fluid by radiation, controlling the flow rate of the fluid in said radiant heat exchange zone to maintain the walls of said conveyance-regeneration zone below about 975° F. and to heat said fluid, and passing the heated fluid into said conversion zone whereby a substantial portion of the heat of regeneration is recovered and utilized in said conversion zone.

5. A process according to claim 4 in combination with the steps of passing a hydrogen-containing gas through said conversion zone with said hydrocarbon, recovering at least part of the hydrogen as a noncondensed phase after cooling and partially condensing the conversion zone effluent, and returning at least part of the hydrogen as recycle gas to said conversion zone by passing it as said part of a fluid to be contacted first through said radiant heat exchange zone.

6. A process according to claim 5 in combination with the steps of further heating the preheated hydrogen from said radiant heat exchange zone to a temperature different from the average conversion zone temperature, and injecting part of this hydrogen into said conversion zone at at least one point along the length thereof to mix with said hydrocarbon flowing therethrough and at least partially compensate for temperature changes in said zone.

7. A process according to claim 6 wherein the catalyst is cobalt molybdate, said hydrocarbon is a low knock rating naphtha contaminated with hydrocarbon derivatives of sulfur and nitrogen, the temperature of said conversion zone is between about 700° F. and about 1100° F., the pressure thereof is between about 50 p.s.i.g. and about 2000 p.s.i.g., hydrogen recycle gas is passed through said conversion zone at a rate of from about 500 s.c.f. to about 10,000 s.c.f. per barrel of naphtha feed, and the hydrogen injected along the length of said conversion zone is injected at a temperature greater than the average conversion temperature to compensate for the temperature decreases incident to the endothermic hydrocarbon aromatization reactions whereby the converted naphtha is substantially free of said hydrocarbon derivatives of sulfur and nitrogen and has a substantially increased knock rating.

8. In a solids-fluid contacting process wherein a granular solid contact material is recirculated through a fluid contacting zone and then upwardly as a dense bed through a solids regeneration zone, a fluid to be contacted is passed through said contacting zone in direct contact with said solid contact material therein and undergoes reactions whose heat effects normally cause the fluid temperature to change during the contact, a conveyance-regeneration fluid is passed upwardly through said conveyance-regeneration zone at a rate controlled to maintain a substantial pressure gradient therein sufficient to convey said material therethrough and to regenerate it substantially completely without further treatment, and a restriction is applied against the mass of regenerated material discharging at the outlet of said conveyance-regeneration zone to maintain said material therein as a dense mass having substantially the static bulk density of said solid material when at rest, the improvement in combination therewith which comprises the steps of recirculating said conveyance-regeneration fluid from the outlet of said conveyance-regeneration zone through a cooling zone, cooling said fluid therein to dissipate part of the heat of regeneration contained as sensible heat of said fluid, admixing fresh regeneration fluid with the cooled fluid, passing the fresh regeneration fluid mixture back into said conveyance-regeneration zone where it absorbs heat of regeneration as sensible heat in said fluid, passing at least part of said fluid to be contacted through a radiant exchange zone spaced outwardly from and around a substantial portion of the upper walls of said conveyance-regeneration zone, whereby the fluid in said radiant heat exchange zone does not contact the walls of said conveyance-regeneration zone but is heated by radiation thereby cooling the walls of said conveyance-regeneration zone and heating said fluid by radiation, and injecting the thus heated fluid into said contacting zone to contact said solid contact material therein.

9. A process according to claim 8 in combination with the step of controlling the temperature of said conveyance-regeneration zone at values below about 975° F. by controlling the rate of flow of said fluid through said radiant heat exchange zone.

10. In a hydrocarbon conversion process wherein a granular solid hydrocarbon conversion catalyst is recirculated through a hydrocarbon conversion zone and then upwardly as a dense mass through a catalyst regeneration zone, said hydrocarbon is passed under conversion conditions of temperature, pressure, and composition through said conversion zone in direct contact with said catalyst forming a spent hydrocarbonaceous catalyst and a converted hydrocarbon and wherein the conversion reactions occurring normally cause changes in the conversion zone temperature, an oxygen-containing conveyance-regeneration gas is passed upwardly through said conveyance-regeneration zone at a rate controlled to maintain therein a substantial pressure gradient sufficient to convey said spent catalyst therethrough and burn the hydrocarbonaceous deposit therefrom substantially completely without further treatment, and a restriction is applied against the mass of regenerated catalyst discharging at the outlet of said conveyance-regeneration zone to maintain said catalyst therein as a dense mass having substantially its static bulk density when at rest, the improvement in combination therewith which comprises the steps of recirculating said conveyance-regeneration gas from the outlet of said conveyance-regeneration zone through a cooling zone, cooling said gas therein to dissipate part of the heat of regeneration contained as sensible heat of said gas, adding a controlled amount of oxygen to the cooled gas, passing the resulting conveyance-regeneration gas mixture into the inlet of said conveyance-regeneration zone for passage upwardly therethrough, passing at least part of a fluid to be contacted with said catalyst in said conversion zone first through a radiant heat exchange zone spaced outwardly from and surrounding a substantial portion of the upper walls of said conveyance-regeneration zone whereby the fluid in said radiant heat exchange zone does not contact the walls of said conveyance-regeneration zone but is heated by radiation thereby cooling the walls of said conveyance-regeneration zone and heating said fluid by radiation, controlling the flow rate of fluid in said radiant heat exchange zone to maintain the walls of said conveyance-regeneration zone below about 975° F. and to heat said fluid, and passing the heated fluid into said conversion zone whereby a substantial portion of the heat of regeneration is recovered and utilized in said conversion zone.

11. In an apparatus for contacting a fluid with a recirculating stream of granular solid contact material which comprises a solids-receiving and fluid disengaging chamber, a contacting column, a solids pressuring chamber, and a solids induction chamber disposed at successively lower levels, and an elongated conveyance-regeneration conduit communicating at its inlet with a low point in said induction chamber and at its outlet with said solids-receiving and fluid disengaging chamber, means adjacent said outlet to apply a force against solids discharging therefrom to maintain them in said conduit substantially at their static bulk density, inlet and outlet means for passing a fluid through said contacting column, a fluid outlet for disengaged fluid from said fluid disengaging chamber, and means communicating with said solids pressuring chamber for the introduction and removal of fluids, the improvement which comprises in combination therewith a primary heat exchanger surrounding at least the part of said conveyance-regeneration conduit nearest its inlet opening and having an inlet at the top thereof and an outlet opening adjacent and communicating with said inlet opening of said conveyance-regeneration chamber, a cooling means communicating in fluid-receiving relation with said fluid outlet from said fluid disengaging chamber, means for passing fluid from said cooling means back into said inlet of said primary heat exchanger, a secondary heat exchanger disposed along a substantial portion of said conveyance-regeneration conduit above said primary heat exchanger, a fluid inlet opening into said secondary heat exchanger, a fluid outlet opening therefrom into said contacting column, and fluid flow control means to maintain the temperature of the wall of said conveyance-regenerator conduit adjacent said secondary heat exchanger at a value below about 975° F., said secondary heat exchanger comprising a plurality of elongated tubes disposed around the outer wall of said conveyance-regenerator conduit, hemi-toroidal header manifolds at the upper and lower ends of said tubes forming therewith a pair of hemi-cylindrical tube cages fitted around said conveyance-regenerator conduit, and support means for attaching said cages to said conduit.

12. An apparatus according to claim 11 wherein said tubes in said tube cage are spaced apart from the external wall of said conveyance-regenerator conduit in radiant heat-receiving relation thereto, in combination with a radiant heat reflector surrounding said tube cage.

13. An apparatus for the conveyance and regeneration of spent solid contact material containing a combustible material deposited thereon which comprises an induction chamber, a solids inlet opening thereinto, a vertically elongated conveyance-regeneration conduit having its opening at a low point in said induction chamber and its outlet opening at an elevated point above said induction chamber, means adjacent said outlet opening for applying a flow restriction against solids discharging therefrom without substantially restricting a simultaneous discharge of fluid, a primary heat exchange chamber surrounding the lower part of said conveyance-regeneration conduit and which is closed at its upper end and opens into said induction chamber adjacent the inlet to said conveyance regeneration conduit, an inlet conduit for conveyance-regeneration gas adjacent the closed upper end of said primary heat exchange chamber, a secondary heat exchanger surrounding a substantial part of the length of said conveyance-regeneration conduit above said primary heat exchange chamber, and inlet and outlet conduits communicating with said secondary heat exchanger for a fluid heat transfer medium, said secondary heat exchanger comprising a generally cylindrical heat radiator surrounding said conveyance-regeneration conduit forming an annular space therebetween, a plurality of elongated tubes disposed therein parallel to said conveyance-regenerator conduit in radiant heat receiving relation to said conduit and said radiator, an upper and lower manifold connecting the ends of said elongated tubes, and inlet and outlet conduits for a heat exchange medium communicating with said manifolds.

14. An apparatus for the conveyance and regeneration of spent solid contact material containing a combustible material deposited thereon which comprises an induction chamber, a solids inlet opening thereinto, a vertically elongated conveyance-regeneration conduit having its opening at a low point in said induction chamber and its outlet opening at an elevated point above said induction chamber, means adjacent said outlet opening for applying a flow restriction against solids discharging therefrom without substantially restricting a simultaneous discharge of fluid, an inlet for conveyance-regeneration fluid communicating with the conveyance-regenerator conduit inlet, a heat exchanger surrounding a substantial part of the length of said conveyance-regeneration conduit, said exchanger comprising a generally cylindrical heat radiator surrounding said conveyance-regeneration conduit forming an annular space therebetween, a plurality of elongated tubes disposed therein parallel to said conveyance-regenerator conduit in radiant heat receiving relation to said conduit and said radiator, an upper and lower manifold connecting the ends of said elongated tubes, and inlet and outlet conduits for a heat exchange medium communicating with said manifolds.

References Cited in the file of this patent

UNITED STATES PATENTS

| | | |
|---|---|---|
| 2,301,044 | Head et al. | Nov. 3, 1942 |
| 2,324,165 | Layng et al. | July 13, 1943 |
| 2,330,069 | Marshall | Sept. 21, 1943 |
| 2,377,512 | Page | June 5, 1945 |
| 2,387,798 | Kubicek et al. | Oct. 30, 1945 |
| 2,489,863 | Collins et al. | Nov. 29, 1949 |
| 2,499,255 | Parker | Feb. 28, 1950 |
| 2,499,304 | Evans | Feb. 28, 1950 |
| 2,597,346 | Leffer | May 20, 1952 |
| 2,661,321 | Schutte | Dec. 1, 1953 |
| 2,684,124 | Hines | July 20, 1954 |
| 2,684,390 | Bills | July 20, 1954 |
| 2,739,994 | Bills | Mar. 27, 1956 |
| 2,750,181 | Quigg | June 12, 1956 |
| 2,758,059 | Berg | Aug. 7, 1956 |